(12) United States Patent
Dragone

(10) Patent No.: US 7,702,200 B2
(45) Date of Patent: Apr. 20, 2010

(54) WAVEGUIDE GRATING OPTICAL ROUTER SUITABLE FOR CWDM

(76) Inventor: Corrado Pietro Dragone, 43 Windsor Dr., Little Silver, NJ (US) 07739

(*) Notice: Subject to any disclaimer, the term of this patent is extended or adjusted under 35 U.S.C. 154(b) by 0 days.

(21) Appl. No.: 12/151,469

(22) Filed: May 7, 2008

(65) Prior Publication Data

US 2009/0220193 A1    Sep. 3, 2009

Related U.S. Application Data

(60) Provisional application No. 61/067,395, filed on Feb. 28, 2008.

(51) Int. Cl.
    G02B 6/34   (2006.01)
    G02B 6/26   (2006.01)
    G02B 6/42   (2006.01)

(52) U.S. Cl. .................. 385/37; 385/1; 385/15; 385/16; 385/22; 385/23; 385/31; 385/39; 385/46; 385/50

(58) Field of Classification Search ............ 385/37, 385/1, 15, 16, 22, 23, 31, 39, 46, 50
See application file for complete search history.

(56) References Cited

U.S. PATENT DOCUMENTS

| | | | |
|---|---|---|---|
| 5,136,671 A | | 8/1992 | Dragone |
| 5,212,758 A | * | 5/1993 | Adar et al. ............. 385/129 |
| 5,412,744 A | | 5/1995 | Dragone |
| 5,745,618 A | | 4/1998 | Li |
| 5,822,481 A | * | 10/1998 | Mestric ............. 385/46 |
| 5,943,452 A | * | 8/1999 | Himeno et al. ............. 385/15 |
| 6,125,219 A | * | 9/2000 | Bruno et al. ............. 385/24 |
| 6,289,146 B1 | * | 9/2001 | Bruno et al. ............. 385/24 |
| 6,396,977 B1 | * | 5/2002 | Dragone ............. 385/24 |
| 6,873,766 B2 | | 3/2005 | Dragone |
| 7,003,198 B2 | * | 2/2006 | Doerr ............. 385/37 |
| 7,068,888 B1 | | 6/2006 | Dragone |
| 7,283,700 B2 | * | 10/2007 | Dragone ............. 385/24 |
| 2005/0100300 A1 | * | 5/2005 | Joyner et al. ............. 385/129 |

FOREIGN PATENT DOCUMENTS

| | | |
|---|---|---|
| EP | 0921432 A1 | 6/1999 |
| GB | 2384320 A * | 7/2003 |
| WO | WO 03/062888 A2 * | 7/2003 |

(Continued)

OTHER PUBLICATIONS

Dragone, Theory of Multiplexing with Rectangular Transfer Functions, IEEE J. Sel. Topics. Quantum Electron., vol. 8, No. 6, pp. 1168-1178 (Nov. 2002).

(Continued)

*Primary Examiner*—Ryan Lepisto
(74) *Attorney, Agent, or Firm*—Schwabe, Williamson & Wyatt, P.C.

(57) ABSTRACT

A planar optical device useful as a low order wavelength router is realized by using a waveguide grating comprising two curved arrays of opposite curvatures. The diffraction order is determined by the angles of rotation of the two curved arrays, and any nonzero order less than about 30 can be realized. This arrangement is smaller, and performs better than a previous grating using a combination of three curved arrays.

28 Claims, 9 Drawing Sheets

FOREIGN PATENT DOCUMENTS

WO  2004083922 A  9/2004

OTHER PUBLICATIONS

Lee et al., Fiber to the Home Using a PON Infrastructure, J. Lightwave Technol., vol. 24, No., pp. 4568-4583 (Dec. 2006).

Dragone et al., Low-Loss N × N Wavelength Router, Electronic Letters (Mar. 2005).

International Search Report and Written Opinion of the International Searching Authority for PCT Application No. PCT/US2009/035253 mailed Jun. 30, 2009.

\* cited by examiner

WAVEGUIDE GRATING OPTICAL ROUTER SUITABLE FOR CWDM

CROSS REFERENCES TO RELATED APPLICATIONS

This application claims the benefits under 35 U.S.C. 119(e) of U. S. Provisional Application Ser. No. 61/067,395, entitled "Improved Low Order Grating", filed on Feb. 28, 2008.

FIELD OF THE INVENTION

This invention relates to optical filters, and more particularly, to Waveguide Grating Routers (WGR) with small diffraction orders suitable for Course Wavelength Division Multiplexing (CWDM).

BACKGROUND OF THE INVENTION

A key component in current optical networks is the waveguide grating router described in U.S. Pat. No. 5,136,671, issued on Aug. 4, 1992, and entitled "Improved Optical Switch, Multiplexer and Demultiplexer". This router is currently used in optical networks to increase the long distance capacity of optical fibers by increasing the number of wavelength channels simultaneously transmitted in each fiber. Typically, in optical networks using Dense Wavelength Division Multiplexing (DWDM) the order of each router is larger than 30, and the grating can then be realized by simply using a symmetric arrangement of two identical sections A and B, equally contributing to the order of the grating as shown in FIG. 1. On the other hand, in Local Access Networks using Course Wavelength Division Multiplexing (CWDM) the order can be appreciably smaller than 30, and the grating geometry must then be modified, as shown for instance in U.S. Pat. No. 5,212,758, issued on May 18, 1993. In that patent the grating comprises two sections A and B of opposite curvatures, and an additional section C is included between A and B as shown in FIG. 2. A disadvantage of this arrangement, however, is that section C substantially increases the size of the grating, thus increasing loss and crosstalk, and reducing the maximum number of devices that can be included in each wafer.

SUMMARY OF THE INVENTION

The present invention, an improved low order optical router, describes an improved grating arrangement which substantially reduces the size, and improves the performance, of a previous arrangement of three curved arrays. Instead of three curved arrays, the new arrangement only includes two curved arrays of opposite curvatures, and the order can be as large as 30. The complete grating is a waveguide array comprising 1) an input radial array, 2) a first curved array, 3) an array of straight waveguides, 4) a second curved array of curvature opposite to the first, and 5) an output radial array. In another embodiment, the two curved arrays are each characterized by minimum curvature radius produced inside the grating aperture. In another embodiment, a bidirectional router with improved spectral efficiency is realized by including in the output radial array a special transition, whose output period is equal to half the array period.

DETAILED DESCRIPTION OF VARIOUS ILLUSTRATIVE EMBODIMENTS

In the following description, the first digit in each element designation refers to the figure in which that element is located (e.g., 201 is located in FIG. 2). Additionally, the remaining digits are the same for similar elements occurring in different Figures.

As previously explained above, the arrangement of FIG. 2 has certain disadvantages due to the addition of section C. Accordingly, in the present patent, section C is removed, and a nonzero order is realized by properly modifying sections A and B. The new arrangement is smaller and it performs better than the previous arrangement of FIG. 2. Moreover, the order can be as large as 30. The new arrangement is the preferred choice for most applications, such as Course Wavelength Division Multiplexing (CWDM), requiring diffraction orders smaller than about 30.

Router Description

Figure 1:
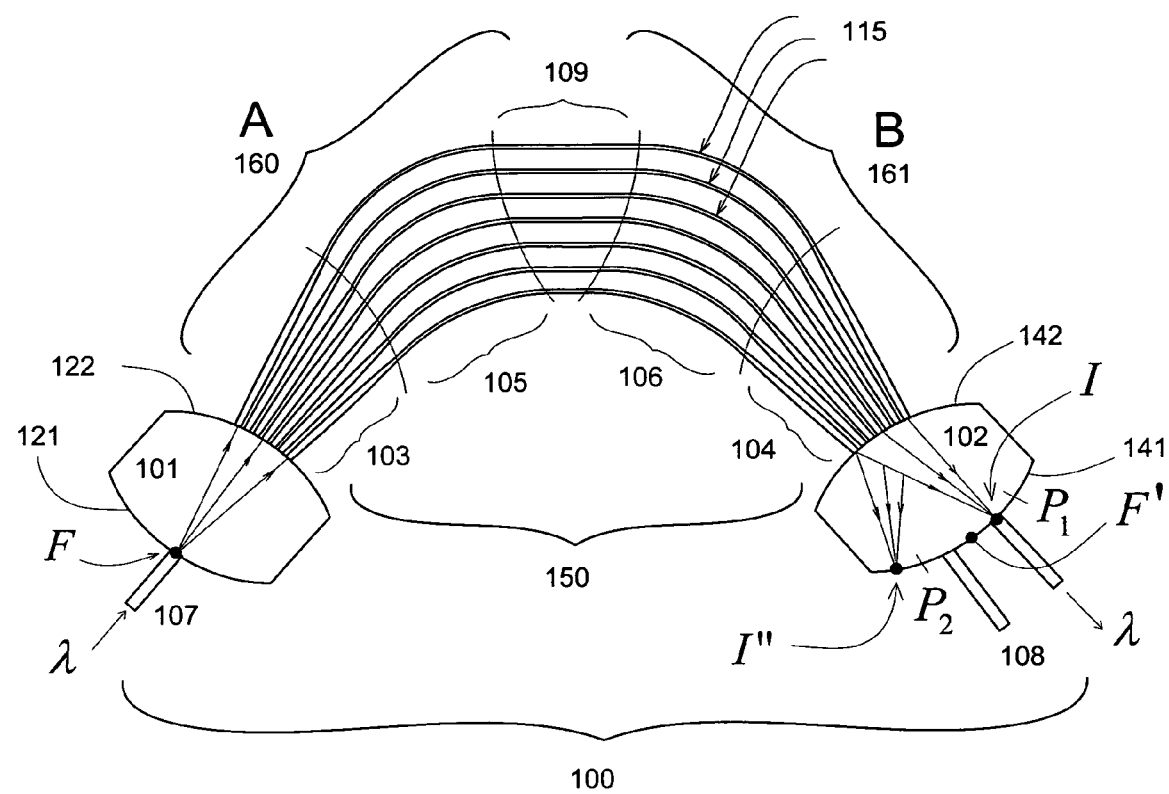
FIG. 1 illustrates the basic prior art form of a high order waveguide grating router. The grating consists of two similar sections A and B equally contributing to each grating diffraction order.

FIG. 1 shows the basic structure of a prior art imaging arrangement 100 involving a waveguide grating of the form used in this invention. Note the imaging arrangement will also be referred to herein as a router. The imaging arrangement 100 includes an input section 101 and an output section 102 spaced apart and interconnected by a grating 150, formed by a plurality of M waveguides 115 called the arms of the grating. The input and output sections, also called couplers, typically are each free-space slab waveguides, and the arrangement has the property that wave energy applied by an input waveguide 107 acting as a point source forms a plurality of output images, of which two are shown as I,I" in FIG. 1. The optical waveguide arms 115 typically are thin narrow layers (planar strips) of silica core supported on a planar silicon wafer, as known in the art.

In a conventional imaging arrangement or router, the input and output ports are connected to the input and output couplers 101 and 102 along portions of two circles that are typically referred to as the input 121 and output 141 circles of the router. For simplicity, FIG. 1 shows only one input 107 and two output 108 ports.

The grating is a waveguide array consisting of several sections. The first and the last sections 103 and 104 are radial arrays, which are connected to the input and output couplers 101 and 102 along portions of two circles which will be referred to as the input 122 and output 142 circles of the grating. Notice the foci F and F' of the two radial arrays are located on the input and output circles of the router. The complete grating consists of two parts A (160) and B (161), each including a radial array (103 or 104) and a curved array (105 or 106), and the two parts are joined together by an array 109 of parallel waveguides.

The result is a router that produces a wavelength dependent output image of each input signal. The location of each output image is determined by its wavelength λ and therefore, signals of different wavelengths from a particular input port give rise to separate images that can be received by different output ports. Typically optical fibers are used for applying input signals to the input ports and for extracting output signals from the output ports. In practice, many output ports will be needed, if the router is to send signals to many different destinations. Similarly, several input ports may be needed, in order to receive signals from different inputs. In wavelength division optical networks, the different wavelengths would represent different communication channels.

The properties of the arrangement of FIG. 1 are best described next by considering its imaging properties in response to an input signal of variable wavelength λ applied to the input waveguide 107. The input signal in FIG. 1 is radiated from the waveguide location towards the receiving apertures of the arms 115 forming the grating 150. As discussed earlier, there would be an appropriate number M of arms in the grating 150. At a particular input wavelength, each arm receives a component of the input signal. The signal is therefore split into many components, each traveling along a particular arm. Each arm applies to its component an appropriate phase shift, which is wavelength dependent, and it is proportional to the optical path length of the arm. In a conventional router, successive arms are characterized to a good approximation by a constant path length difference. As a consequence, the arrangement produces on the output curve 141 a set of equally spaced images I, I" of the input signal. These images are produced at those particular locations for which the various signal components radiated by the arms add in phase, within an integer multiple of 2π. The various images represent different orders (different integer multiples of 2π) and they have three basic properties. First, their locations vary with the wavelength λ. Second, their intensities also vary, and they are determined by the radiation characteristics of the output periodic array 104. Third, the images are equally spaced with spacing Ω determined by the angular spacing Δθ of the array elements, $$\Omega = \frac{\lambda}{n\Delta\theta}$$

where n is the refractive index. Of greatest importance in a conventional router is the central image I of highest intensity. This is the image closest to the focal point F' of the arms and it is called the principal image. This image is produced inside the central zone, which is an interval $P_1,P_2$ of width Ω centered at F'. The remaining images (of different orders) such as I" are produced outside the central zone. These images typically have appreciably smaller intensity in all cases except when they are close to the boundaries $P_1,P_2$ of the central zone.

In a conventional router, all the output ports or waveguides are located inside the central zone (which in FIG. 1 represents the field of view $P_1,P_2$ of the router) and receive only the images produced in the central zone. In FIG. 1, only two output waveguide 108 are shown for simplicity, and the input signal is efficiently transmitted to a particular waveguide at those wavelengths for which the principal image location coincides with the waveguide location. As pointed out earlier, I is defined as the particular image inside the central zone $P_1,P_2$. Therefore the variation of I is a periodic (cyclic) function of the signal wavelength. In each period, the variation exactly covers the entire central zone $P_1,P_2$. As a result, the transmission coefficient has periodic behavior consisting of equally spaced maxima. Each maximum corresponds to a wavelength for which the image I coincides with the output waveguide location. The period, given by the wavelength spacing $\lambda_f$ between maxima, is called the free-spectral range. In a conventional router, images produced outside the central zone (e.g., I' of FIG. 1) are considered useless and so undesirable. Therefore, minimizing their intensities generally optimizes the router. To this purpose one must optimize the radiation characteristics of the periodic array 104 by including in the grating suitable transitions as shown in U.S. Pat. No. 6,873,766 B2, issued on Mar. 29, 2005, and U.S. Pat. No. 7,068,888 B1, issued on Jun. 27, 2006.

To summarize, the router response to an input signal of variable wavelength is a variable principal image whose location is a function of the signal wavelength λ. As a consequence, different wavelengths simultaneously applied to the same input waveguide can be transmitted to different output waveguides. However, the above arrangement is only suitable for large diffraction orders, typically larger than 30. For smaller orders, the above arrangement must be modified, and a possible choice is the arrangement proposed previously in U.S. Pat. No. 5,212,758, issued on May 18, 1993.

Figure 2:
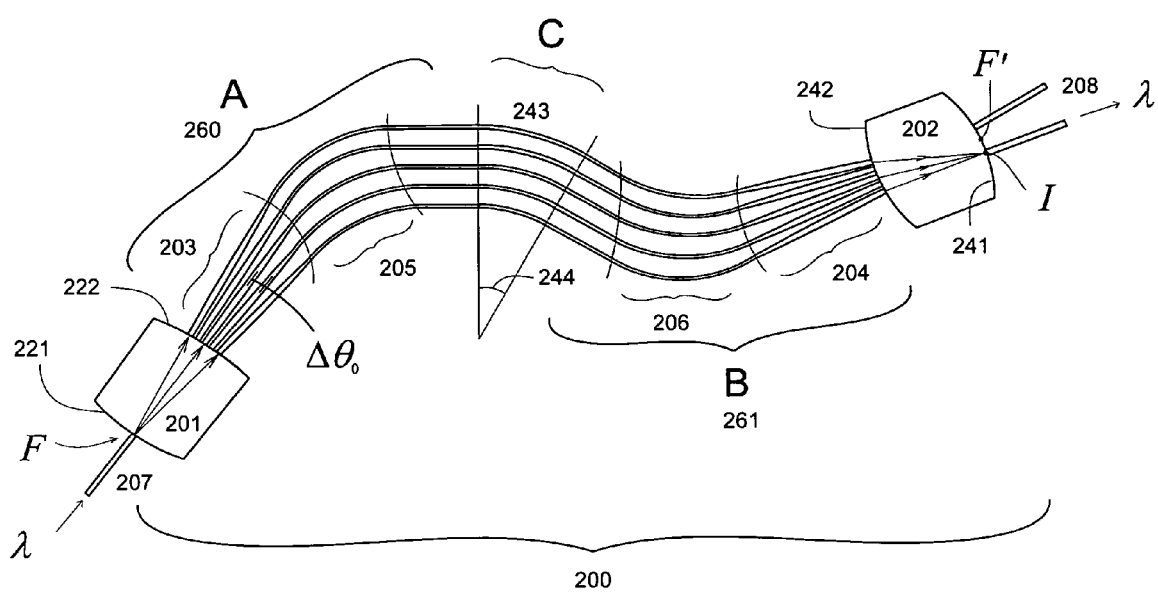
FIG. 2 illustrates the basic prior art form of a low order waveguide grating router derived from FIG. 1 by flipping (vertically) section B and inserting between A and B an additional section C. In this arrangement each order is entirely determined by the central section C.

In a manner analogous to FIG. 1, an arrangement in FIG. 2 includes parts A (260) and B (261), an input section 201 and an output section 202, one input 207 and two output 208 ports, input 221 and output 241 circles, first 203 and last 204 sections, and input 222 and output 242 circles.

Figure 3:
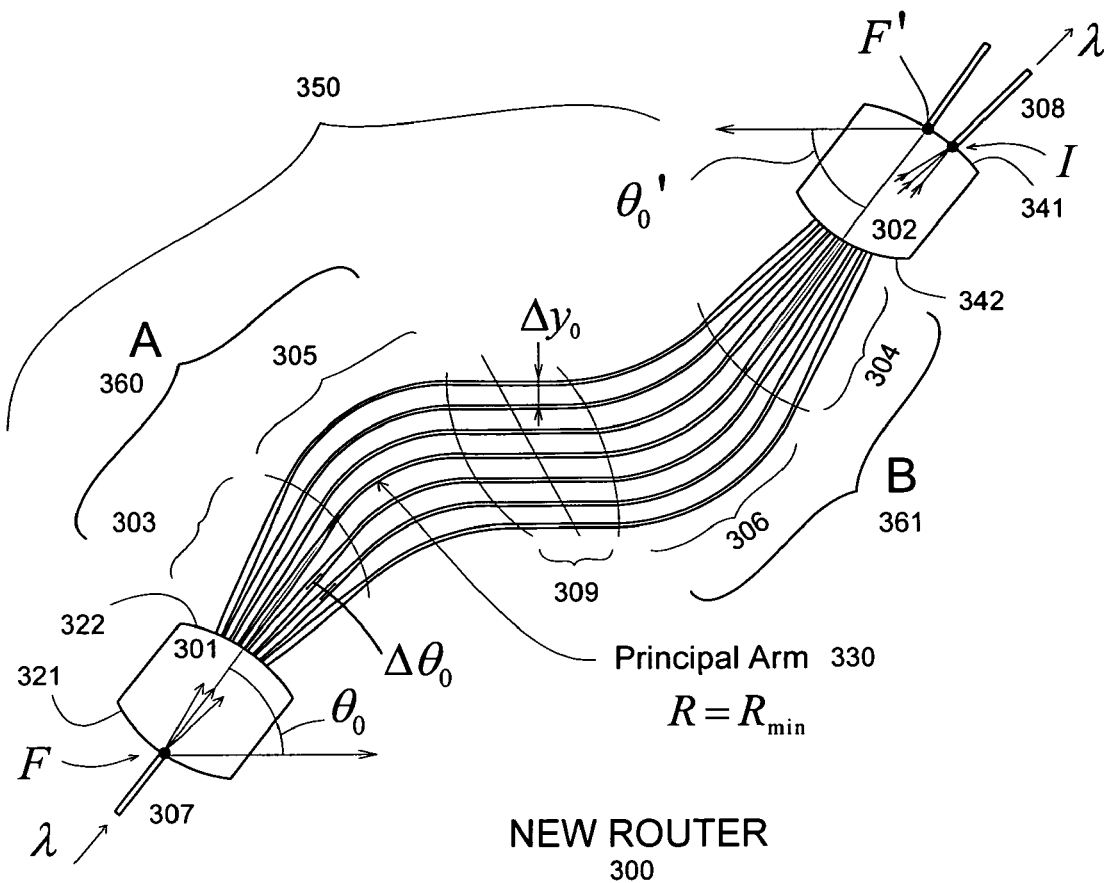
FIG. 3 shows the new arrangement, derived from FIG. 2 by removing section C and choosing different parameters (rotation angles) in sections A and B.

This arrangement, shown in FIG. 2, includes three curved arrays 205, 243, 206, and it can be derived as follows from the arrangement of FIG. 1. The grating of FIG. 1 consists of two identical parts A and B. Moreover, this grating is generally designed assuming the same curvature for all curved waveguides and, as a consequence, then the straight waveguides in the central region of the grating are not uniformly spaced (even though for simplicity they are shown equally spaced in FIG. 1). On the other hand, in FIG. 2, the waveguides in the central region are uniformly spaced, and the grating in this case comprises three parts A, C, B. Accordingly, the grating of FIG. 2 is obtained from that of FIG. 1 in three steps, namely by first choosing in FIG. 1 the same waveguide spacing in the central region of the grating, by next flipping vertically the second part B, and by then including between A and B an additional array C consisting of equally spaced (curved) waveguides. One then obtains the arrangement of FIG. 2, including three curved arrays 205, 243, 206. The first and last arrays 205 and 206 do not contribute to the order (of the principal image) and therefore the order is entirely produced by the intermediate array 243. An attractive feature of this arrangement is that any order can be realized by properly choosing the angle of rotation 244 of the intermediate array 243. On the other hand, the intermediate array 243 substantially increases the size of the grating, it reduces the maximum number of devices that can be included on each wafer, and it also increases loss and crosstalk. Thus, in this patent both size and performance are substantially improved, as shown in FIG. 3, by removing the intermediate array 243 and properly modifying the two arrays 205, 206 as shown in this patent. The new grating of FIG. 3 is generally the preferred arrangement, if the order is less than about 30.

In FIG. 3, an arrangement 300 of a router includes parts A (360) and B (361). The arrangement 300 also includes one input 307 and two output 308 ports.

The grating of FIG. 3 is similar to the high order grating of FIG. 1. In both cases the grating comprises two parts A and B, each including a radial array (303 or 304) and a curved array (305 or 306) and in both cases the two parts are joined together by an array 309 of parallel waveguides. Moreover, each part is characterized in both cases by a constant path length difference from each arm to the next. On the other hand, the high order grating of FIG. 1 is simpler to design, since the straight waveguides in the central region of the grating need not be uniformly spaced and, as a consequence, the same curvature can be chosen for all curved waveguides. Instead, in the other case, the straight waveguides in the central region of FIG. 3 must be equally spaced. As a consequence, the curved waveguides in FIG. 3 must have different curvatures, and the curvature variation in parts A and B must then be minimized as shown in this patent.

As in FIG. 1, the router in FIG. 3 comprises a first coupler 301, a waveguide grating 350 of M arms of lengths $L_1$, $L_2 \ldots, L_M$, and a second coupler 302. As pointed out earlier, the grating is properly designed so that successive arms (waveguides) are characterized by a constant increase in length $\Delta L = L_2 - L_1 = L_3 - L_2$, etc from each arm to the next. As in FIG. 1, the complete grating in FIG. 3 comprises a total of five arrays, namely an input radial array 303, a first curved array 305, an intermediate array 309 of parallel waveguides, a second curved array 306, and an output radial array 304. The input and output radial arrays are respectively connected to the input and output couplers 301 and 302, along the input 322 and output 342 circles of the grating. In order to maximize the grating efficiency, the radial waveguides must be strongly coupled in the vicinity of each coupler. On the other hand, in the central section of the grating, the coupling must be essentially zero. As in FIG. 1, the waveguides of each radial array are characterized by a constant angular separation $\Delta\theta_0$, and their focal points F and F' are respectively located on the input and output circles 321 and 341 of the router.

Notice, each grating arm comprises several sections which are characterized in general by slightly different effective refractive indexes. Therefore the optical path length of each section is equal to the effective refractive index of that section multiplied by the length. Accordingly, the total optical path length is the average refractive index multiplied by the total length. In the following, for simplicity, a constant refractive index will be assumed in each arm, since this will not affect the substance of the results.

Under the above conditions, consider the wavelength response to an input signal of variable wavelength λ applied to the input waveguide. The input waveguide produces in the input coupler 301 a radial wave, and the grating performs on the incident signal three transformations. First, the incident signal is split by the first radial array 303 into M separate components, each propagating in a particular waveguide (arm) of the grating. Second, the grating applies between neighboring components a wavelength dependent phase shift $$\Delta\phi = 2\pi n \Delta L/\lambda, (\Delta L \neq 0)$$

determined by the path length difference $\Delta L$, the wavelength λ and the arm effective refractive index n. Third, the M components are recombined by the output radial array 304, thus producing in the output coupler 302 a radial wave, converging towards a particular output location on the output circle, thus forming at that location an output image of the input signal. The image location is determined by the phase shift $\Delta\phi$ and it is therefore a function of the signal wavelength. In particular, if $\Delta L/\lambda$ is an integer and the input waveguide is located at the focal point F, then the output image is also produced at the (output) focal point F'. As pointed out earlier, the grating also produces unwanted images, which however will be ignored here since they will be essentially eliminated by including in the grating suitable output transitions as pointed out earlier.

In general, in the design of a router, several requirements must be considered. First, it is important to optimize the grating efficiency as shown previously in the above two patents. Second, in order to minimize radiation losses in the bends, the curvature radius R in each bend must not be smaller than a minimum value $R_{min}$, determined by the refractive index contrast. Third, in the curved regions of the grating, the spacing between adjacent arms should be characterized by minimal variation. Fourth, it is generally important to minimize the size of the router, so as to maximize the number of devices on each wafer, thus reducing the cost of each device. Finally, loss and crosstalk should also be minimized. The last two requirements are difficult to satisfy in FIG. 2, which has the disadvantage of requiring three separate sections A, B and C instead of two sections A and B as in the arrangement of FIG. 1. Notice, in the prior art arrangement of FIG. 2, the path length difference $\Delta L$ is entirely caused by the additional curved section C. The other two sections A and B do not contribute to $\Delta L$. These two sections are identical, except for a rotation of 180°, causing their contributions to $\Delta L$ to cancel each other. Therefore an additional section C of curved waveguides is required in FIG. 2 in order to produce a nonzero $\Delta L$. This section C appreciably increases the size of the grating and, as a consequence, it also increases loss and crosstalk (which is partly caused by fabrication errors, primarily in the curved sections of the arms).

Here this problem is solved by removing the central section C as shown in FIG. 3. Once this section is removed, the grating obtained from the prior art arrangement of FIG. 2 only includes two identical sections A and B rotated with respect to each other by 180°. Therefore, since the two sections have opposite curvatures, their contributions to $\Delta L$ have opposite signs and the total path length difference $\Delta L$ becomes zero. On the other hand, by properly modifying one of the above two sections, a nonzero $\Delta L$ can be realized as shown in this application. Notice, once the central section C is removed, the two sections A an B are joined together by an array of straight waveguides, uniformly spaced by $\Delta y_0$ as indicated in FIG. 3.

As pointed out earlier, the radial waveguides must be strongly coupled in the vicinity of each coupler 301 or 302. On the other hand, in the curved arrays 305 and 306, the coupling must be essentially zero. These two conditions can be explained as follows.

Consider for instance the radial array 303. Since this array is characterized by a constant $\Delta\theta_0$, it is periodic with period $\Delta\theta_0$. As a consequence, it supports super-modes similar to the radial waves of the coupler, and in this case substantial coupling is desirable in the vicinity of the coupler, since this improves the grating efficiency, provided the coupling decreases very gradually in the radial direction (with increasing distance from the coupler). On the other hand, the curved array 305 connected to the radial array is not periodic. In this case each signal component propagating in a particular arm must produce negligible power transfer to other arms. Any power transfer will affect the phase shifts produced by the arms, thus causing phase aberrations resulting in higher loss and crosstalk. For instance, by assuming a refractive index contrast of 0.6% and waveguides width of about 6 μm, one finds that the waveguide spacing in each curved array must be greater than about 35 μm, and therefore the spacing $\Delta y_0$ must be appreciably larger than this value. For instance, in the examples considered later, $\Delta y_0 = 45$ μm. Notice the waveguides are separated in FIG. 3 by strips of lower refractive index. The fabrication process will generally cause the refractive index in these strips to slightly depend on the waveguide spacing. Therefore, the waveguide spacing in each curved array must be approximately characterized, for all waveguides, by the same longitudinal variation. As shown later this condition is accurately satisfied by properly choosing the grating parameters. Finally, notice the routers considered here are quite different from the router realized previously by using the geometry of FIG. 2. That router only included two output waveguides and the number of arms was about 10. On the other hand, in typical local access applications, the number of output waveguides can be more than 32, and the number of arms can be more than 100. Then, it is important to optimize both size and performance as described in this patent.

Notice the complete grating in FIG. 3 is composed of 5 arrays, namely an input radial array 303, a first curved array 305, a central array of straight waveguides 309, a second curved array 306, and an output radial array 304.

In the following, a prime ( )' will denote the parameters of section B. However, since the two sections A and B have similar properties, only the first section A will be considered initially.

Optimum Design of a Low Order Router

Figure 4:
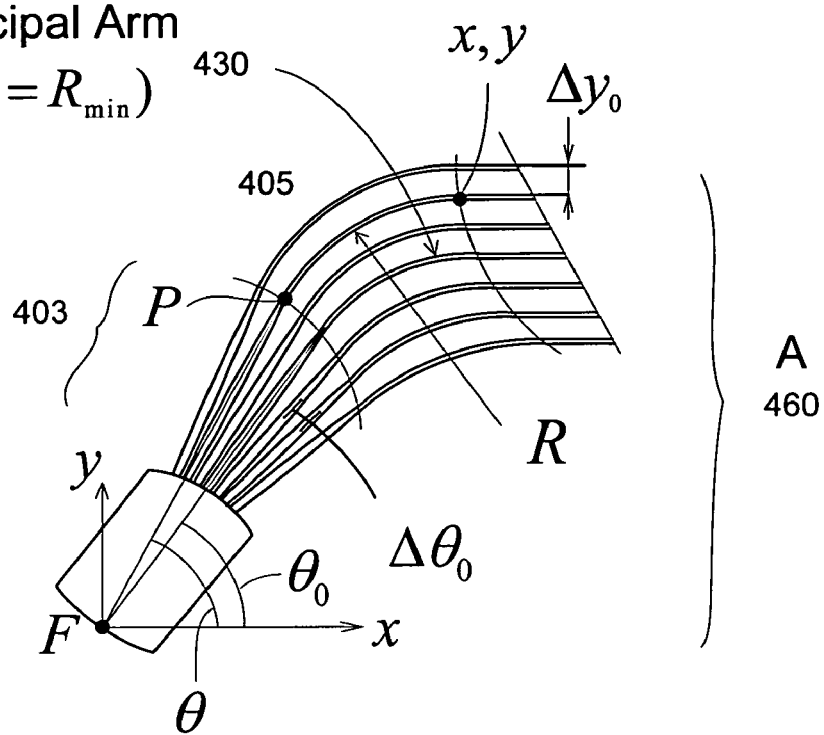
FIG. 4 shows details of section A of FIG. 3
Figure 4:
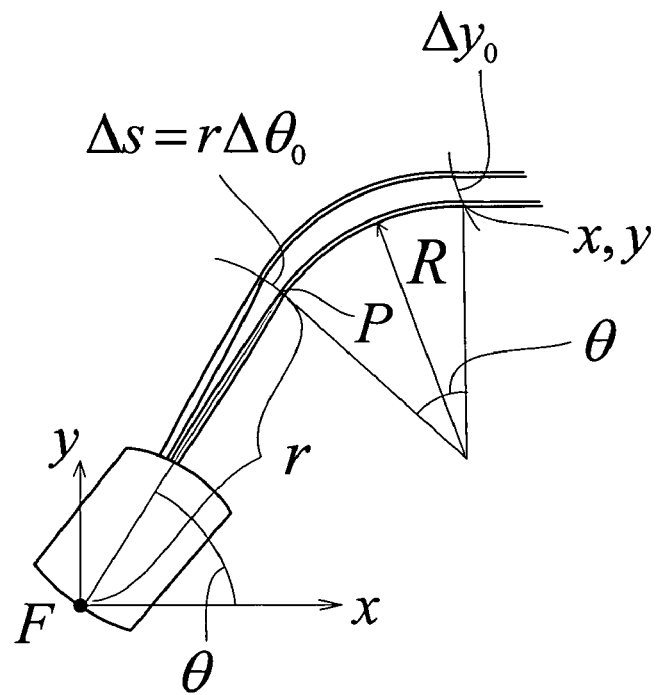

As shown in FIG. 4, section A (460) consists of three parts, namely an array 403 Of radial waveguides, followed by an array 405 of curved waveguides (bends), followed by an array of (equally spaced) straight waveguides. Therefore each arm 430 in section A comprises a radial waveguide connected to a curved waveguide. In the following, P will denote the connection point of these two waveguides, θ will denote the initial angle with respect to the x-direction, r will denote the radial distance of P from the focal point F, and x, y will denote the coordinates at the end of the curved waveguide. Moreover, $\Delta\theta_0$ will denote the (constant) angular separation of the waveguides in the radial array, and $\Delta y_0$ will denote the (constant) separation of the straight waveguides at the end of section A. Notice the arm coordinate θ is also equal to the rotation angle produced by the curved waveguide.

In each bend, it is common practice to eliminate (or substantially reduce) the initial and final curvature discontinuities by including suitable transitions with variable curvature, and each bend then consists of a central section of constant radius R and two (relatively short) end transitions of variable curvatures. On the other hand, the two transitions will be ignored here, since this will simplify the derivation without substantially affecting the results. Thus, it will be assumed that each bend has a constant curvature radius R. As pointed out earlier, the value of R must not be smaller than a minimum value $R_{min}$ determined by the refractive index contrast. For instance, the minimum radius is approximately $R_{min} \simeq 4$ mm for a refractive index contrast of 0.6%. Accordingly, the grating must be designed under the constraint $R \geq R_{min}$. Note here R is characterized by substantial variation as a function of the arm coordinate θ. This variation of R in FIG. 4 is a consequence of the constant waveguide spacing $\Delta y_0$ required at the end of the curved array 405, and it is generally undesirable, since it increases the size of the grating and it reduces the grating performance. Accordingly, the above variation of R will be minimized as shown next.

Figure 5:
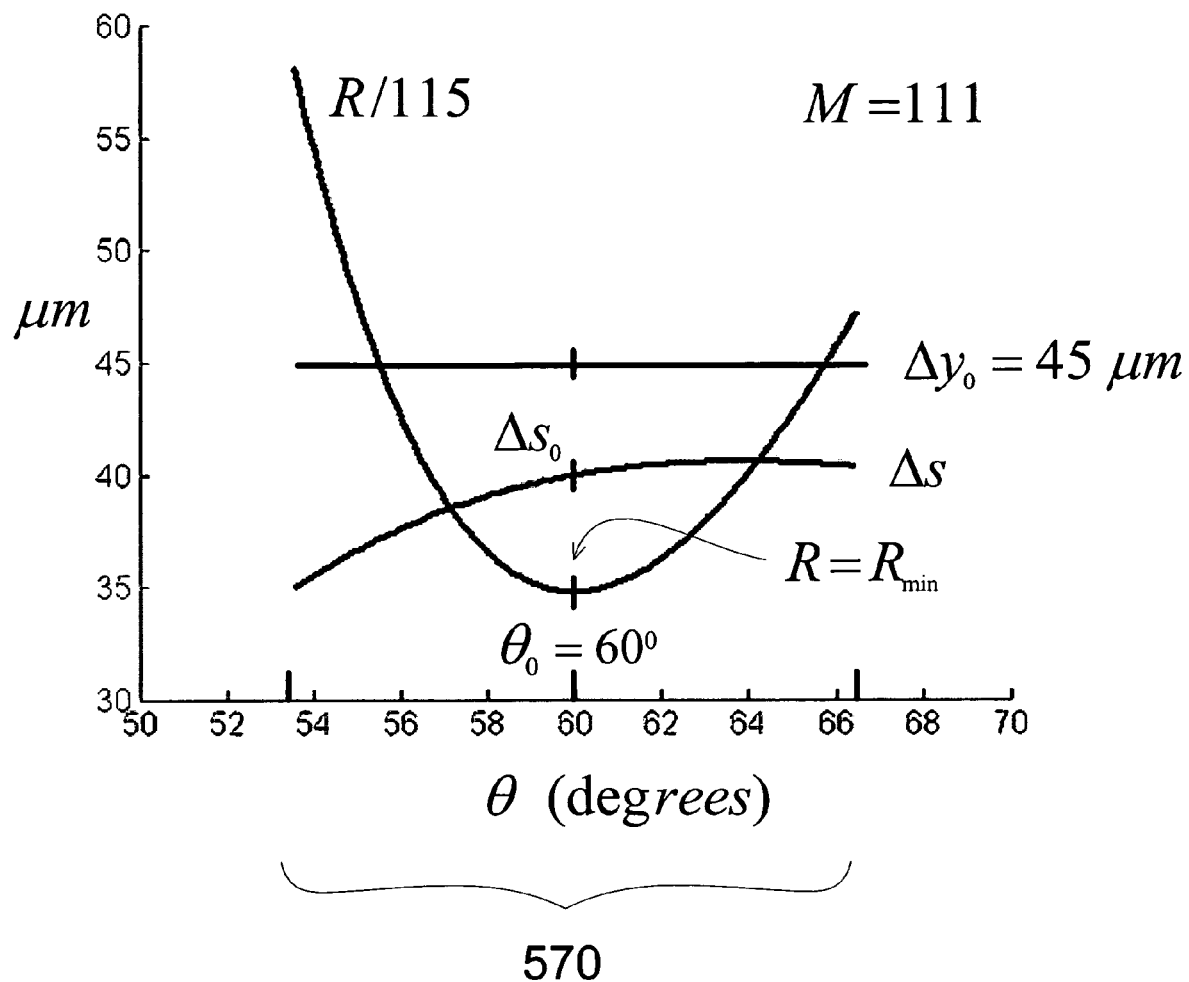
FIG. 5 shows the variations with θ of the parameters Δs, R, $\Delta y_0$ of the curved array of FIG. 4. The parameter Δs is the initial waveguide spacing, $\Delta y_0$ is the final spacing, and R is the waveguide curvature radius.

One can show that the second derivative of R with respect to the angle θ is positive, for the type of arrangement considered here. Because of this property of the second derivative of R, it is possible to produce, inside the grating angular aperture 570 determined by the coordinate θ, a central region of nearly minimum R as shown in FIG. 5. To this purpose, it is sufficient to design the grating so that the first derivative of R vanishes for a particular arm close to the central arm, and this arm will be called the principal arm. By then choosing $R=R_{min}$ for this arm, the variation of R as a function of the angle θ in the vicinity of the principal arm will be approximately stationary (the first derivative will be approximately zero as shown in FIG. 5) and the value of R will be close to the minimum value $R_{min}$. The following considerations apply to both sections A and B. In either case the subscript ( )$_0$ will denote the principal arm. In particular, $\Delta s_0$ will denote the principal value of the waveguide spacing $\Delta s = r\Delta\theta_0$ at the end of the radial array 403.

A property of the grating is that both sections A and B are uniquely determined, for a given diffraction order and given values of $\Delta\theta_0, \Delta y_0$, once the parameters R, r, θ are specified for the principal arm. Accordingly, the design is optimized by properly choosing the parameters of the principal arm, so as to minimize the size of the router, without causing appreciable coupling between adjacent arms in the curved regions. In each curved region, the spacing between neighboring waveguides should be characterized by a well behaved variation along the entire length of each waveguide. In particular, at the junction of each radial section with the curved section, the waveguide spacing $\Delta s = r\Delta\theta_0$ should be smaller that $\Delta y_0$. Moreover, for an optimized grating, the smallest value of $\Delta s$ will be shown to occur for the smallest θ, and this minimum value of $\Delta s$ should be large enough to insure negligible mutual coupling between neighboring arms. On the other hand, the largest $\Delta s$ typically occurs in the vicinity of the top arm, and it must be smaller than $\Delta y_0$. The above two conditions are satisfied straightforwardly by properly choosing $\Delta y_0$ and $\Delta s_0$. An example is illustrated in FIG. 5, where the total number of arms is M=111 and $\Delta y_0 = 45$ μm, $\Delta s_0 = 40$ μm, and $R_{min} = 4$ mm.

In this example the angular aperture of part A of the grating covers the interval 570

Figure 6:
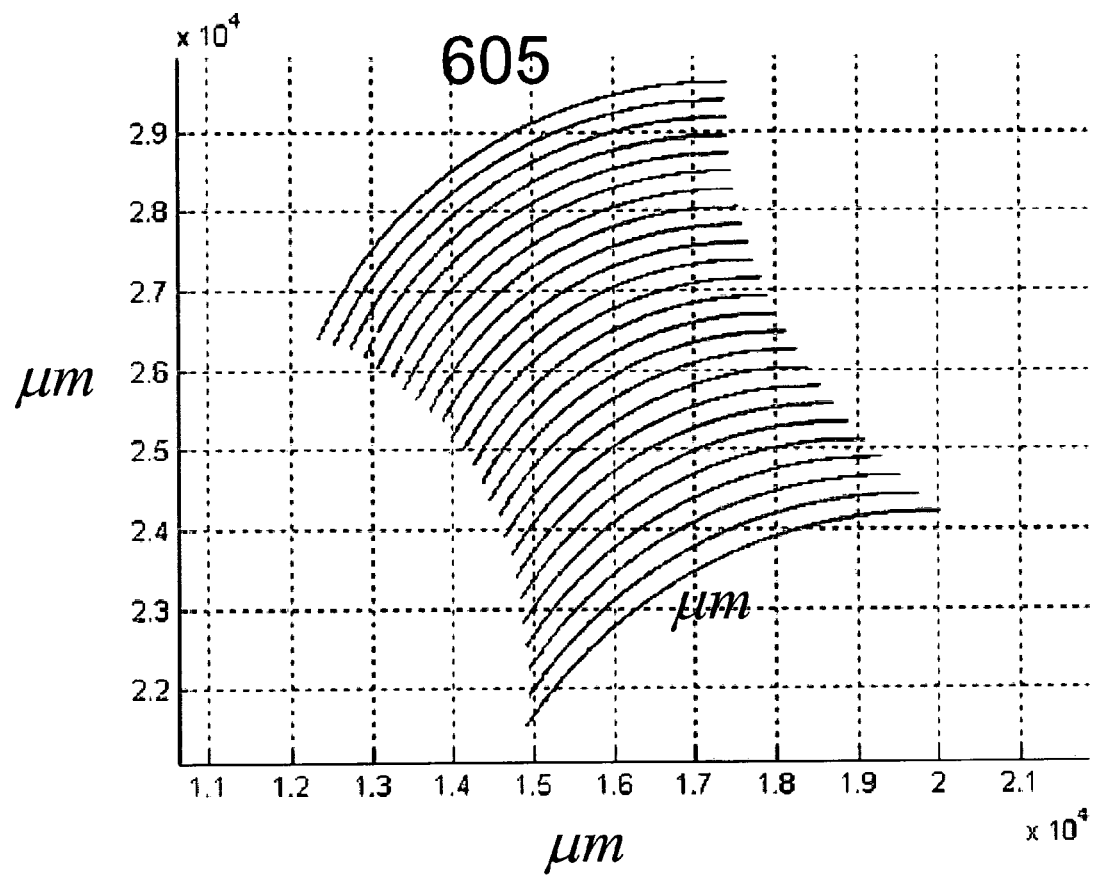
FIG. 6 shows a typical layout of the curved array in FIG. 4. Only some of the waveguides are shown for clarity.

$53.5° \leq \theta \leq 66.5°$ and the smallest R is produced at the center $\theta_0 = 60°$ of the aperture and therefore, as pointed out earlier, the first derivative of R is zero for $\theta_0 = 60°$. Notice the smallest value of $\Delta s$ is produced in the vicinity of the bottom arm, and $\Delta s$ is nearly constant for $\theta > \theta_0$. The total variation of the spacing $\Delta s$ is approximately 7 μm, and it satisfies the two conditions $\Delta s > 35$ μm and $\Delta y_0 > \Delta s$. The former condition is realized by simply choosing a large enough value of $\Delta s_0$ and, the latter condition, by choosing a large enough value of $\Delta y_0$. FIG. 6 shows a mask layout 605 of the curved waveguides in part A. Only some of the waveguides are shown for clarity. One can see that the waveguide spacing is characterized by a well behaved variation in all cases. One can also verify that similar results are obtained for $45° < \theta_0 < 75°$.

Next, consider the path length difference $\Delta L$ between successive arms of the grating. As pointed out earlier, the design is optimized here by specifying zero derivative of R at the principal arm location, so as to produce at that location $R=R_{min}$ as shown in FIG. 5. Under the above conditions, one can show that section A contributes the path length difference $$\Delta L_0 = \tan(\theta_0/2)[\Delta y_0 + \Delta s_0], \quad (R = R_{min}) \tag{1}$$

Similarly, B contributes $$-\Delta L'_0 = -\tan(\theta'_0/2)[\Delta y_0 + \Delta' s_0], \quad (R' = R_{min}) \tag{2}$$

which is now negative because B in FIG. 3 is rotated by 180° with respect to A. The total path length difference ΔL is simply the sum of the above two contributions, $$\Delta L = \Delta L_0 - \Delta L'_0,$$

giving $$\Delta L = [\tan(\theta_0/2) - \tan(\theta'_0/2)]\Delta y_0 + [\tan(\theta_0/2)\Delta s_0 - \tan(\theta'_0/2)\Delta s'_0]. \tag{3}$$

In particular, by choosing $\Delta s'_0 = \Delta s_0$, $$\Delta L = [\tan(\theta_0/2) - \tan(\theta'_0/2)](\Delta y_0 + \Delta s_0) \tag{4}$$

and one can verify that the order $n\Delta L/\lambda$ can be larger than 30 if one assumes $$45° < \theta'_0 < \theta_0 < 75°, \Delta y_0 + \Delta s_0 \approx 85 \, \mu m, \tag{5}$$

and a center wavelength $\lambda = 1.442 \, \mu m$.

Notice the above design can be modified in many ways without affecting the substance of the results. The above expressions were derived assuming in each bend a constant curvature, but similar results are obtained without this restriction. Moreover, the above expressions are not affected if different principal arms are chosen in parts A and B, in which case the principal coordinates $\theta_0$ and $\theta'_0$ correspond to different grating arms.

The parameters $\Delta\theta_0, \Delta\theta'_0$ do not appear explicitly in the above expressions. However, they play an important role in the router design, since they determine the input and output apertures $M\Delta\theta_0, M\Delta\theta'_0$ of the grating, they affect the size and performance of the grating, and they also determine the router magnification, which is equal to the ratio $\Delta\theta_0/\Delta\theta_0$. The values of $1/\Delta\theta_0$ and $1/\Delta\theta'_0$ respectively determine the spacing (and the width) of the input and output waveguides. An important application, described later, is the design of a 1×N router whose output efficiency is optimized by including suitable transitions based on two patents quoted earlier. In this case a small period $\Delta\theta'_0$ may be desirable in section B, and it may then be advantageous to minimize the size of the grating by choosing $\Delta\theta_0 > \Delta'_0$.

Figure 7:
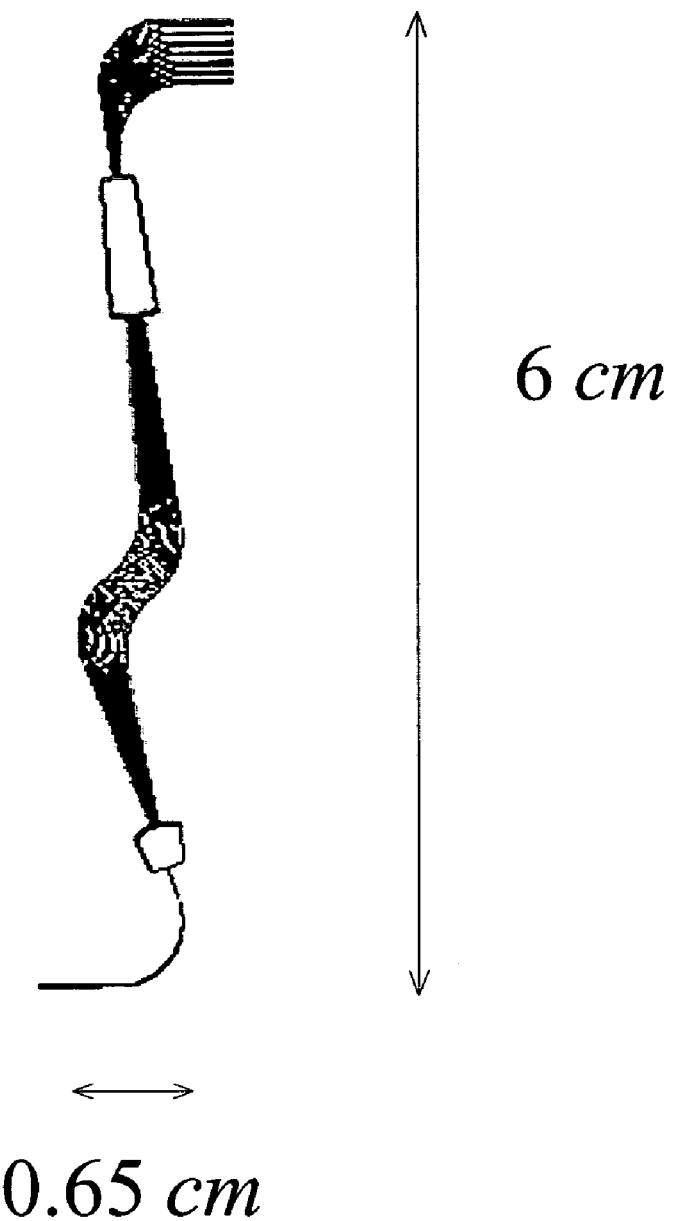
FIG. 7 shows the mask layout of a 1×16 wavelength router with channel spacing of 1250 GHz.

FIG. 7 shows for instance the layout of a 1×16 router characterized by channel spacing of 1250 GHz, suitable for Local Access applications. In this case the grating is characterized by $$\Delta L = 7.95 \, \mu m, \text{ and } \theta_0 = 62°, \tag{6}$$

and it was optimized by assuming a refractive index contrast of 0.6% and choosing $$\theta_0 - \theta'_0 = 8.1°, \Delta y_0 = 45 \, \mu m, r_0\Delta\theta_0 = r'_0\Delta\theta'_0 = 40 \, \mu m \tag{7}$$

Suitable transitions were included in the bends, and therefore the above value $\Delta L = 7.95 \, \mu m$ is slightly different from the value 7.86 μm obtained from expression (4) without transitions. In the above arrangement the router efficiency was optimized by including in the grating special output transitions as shown in the above two patents. The total loss is expected to be about 3 dB, which is the typical loss of commercially available routers of the simpler type shown in FIG. 1.

The router of FIG. 7 is thin and long, and more than 15 devices can fit on a 6 inches wafer, whereas using the arrangement of FIG. 2 the number of devices would be reduced to about 10, and higher loss and crosstalk would be produced.

Next, let $s_{max}$ and $s_{min}$ denote respectively the largest and smallest waveguide separation in the central grating region consisting of the two curved arrays and the central array of straight waveguides. Then, assuming $\theta_0 \geq \theta'_0$ one can verify by using the general expression (3) that the path length difference ΔL is larger than $$\tan(\theta_0/2)\cdot(s_{max}+s_{min}) - \tan(\theta'_0/2)\cdot 2s_{max} \tag{8}$$

and it is smaller than $$\tan(\theta_0/2)\cdot 2s_{max} - \tan(\theta'_0/2)\cdot(s_{max}+s_{min}) \tag{9}$$

As pointed out earlier, condition (3) only applies if each bend has a constant curvature, whereas the above two conditions (8) and (9) include all cases of interest, without the above restriction. The above conditions define the range of router parameters covered by this patent.

So far a constant ΔL was assumed, but it may be advantageous in some cases to modify this condition for several reasons. So far, it was assumed that the input signal produces an input radial wave emanating from the input waveguide location. In practice, the input wave may be afflicted by small aberrations, causing phase errors that can be corrected by slightly modifying the lengths of the arms. Similar aberrations may be caused by the output waveguides, as one can verify by reversing the sense of transmission. Moreover, even in the absence of aberrations, it may be advantageous in some cases to slightly modify the lengths of the arms, for instance in order to widen the passband. The grating must then be modified accordingly, but this will not substantially affect the substance of this patent.

Applications

Figure 8:
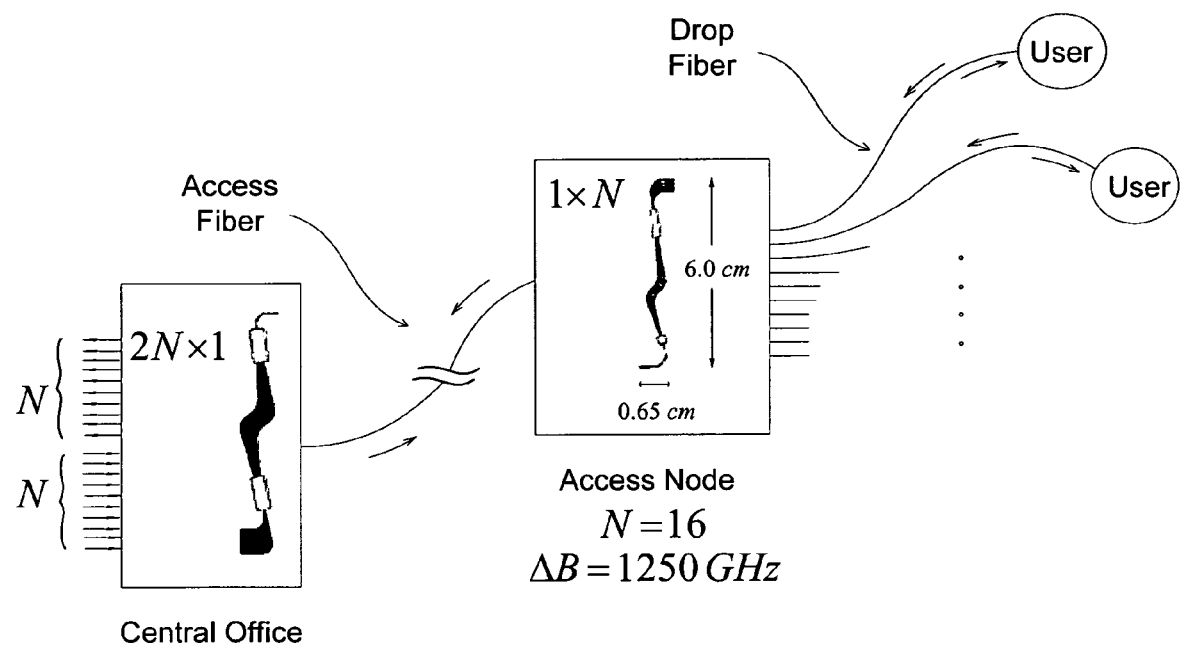
FIG. 8 shows a local access network using a bidirectional arrangement of two routers designed using the arrangement of FIG. 3. Also shown are the mask layouts of the two routers.

The above router is expected to play an important role in next generation Local Access Networks. In this case the initial fiber installation is a large fraction of the initial cost and therefore the cost per user is substantially reduced by increasing the number of users served by each access fiber. Consider for instance an access fiber connected between a central office and an access node serving a particular access area. Then, by using two routers respectively located in the central office and the access node, as shown in FIG. 8, the fiber installation cost per user is minimized by transmitting in the fiber many channels covering the entire available bandwidth B (about 360 nanometers) of the fiber. Moreover, by using the cyclic property of the waveguide grating router, bidirectional transmission in each fiber can be realized in a simple fashion, by using two consecutive cycles of the access router, thus further reducing the total number of fibers in the network.

However, an important limitation of the above technique is that two consecutive cycles cannot provide acceptable efficiency over the entire fiber bandwidth B. Instead, one obtains two separate transmission bands, each produced by one cycle, and the two bands are separated by a band of substantially lower efficiency. As a consequence, a conventional design will only provide efficient transmission over less than 67% of the fiber bandwidth B. Here this problem is solved by maximizing the router efficiency as shown next.

In FIG. 8, a single fiber provides bidirectional transmission between the access node and the central office, and similarly a single drop fiber is used between the access node and each user. In this arrangement, simultaneous transmission in the downstream and upstream directions is realized by using different cycles of the router in the access node. Three important parameters are the number N of channels transmitted in each direction, the channel spacing AB, and the fiber available bandwidth B. As discussed later, the bidirectional router is only efficient in two separate transmission bands, each having width equal to NΔB. The two bands are separated by an intermediate band of lower efficiency, and the fiber bandwidth B exactly covers the three bands. An important parameter in this case is the router spectral efficiency $$E = \frac{2N\Delta B}{B}, \tag{10}$$

determined by the fraction, of the available bandwidth B, that is actually used by the bidirectional router.

Typically, in the above arrangement, the order of each router is less than 10, and one would like the number of channels N to be at least 16, in each direction. One would also like the channel spacing to be large enough to allow the access routers to be used outdoors without temperature control. For this reason it is important to maximize the product NΔB for a given B by maximizing the above spectral efficiency E as discussed next.

Figure 9:
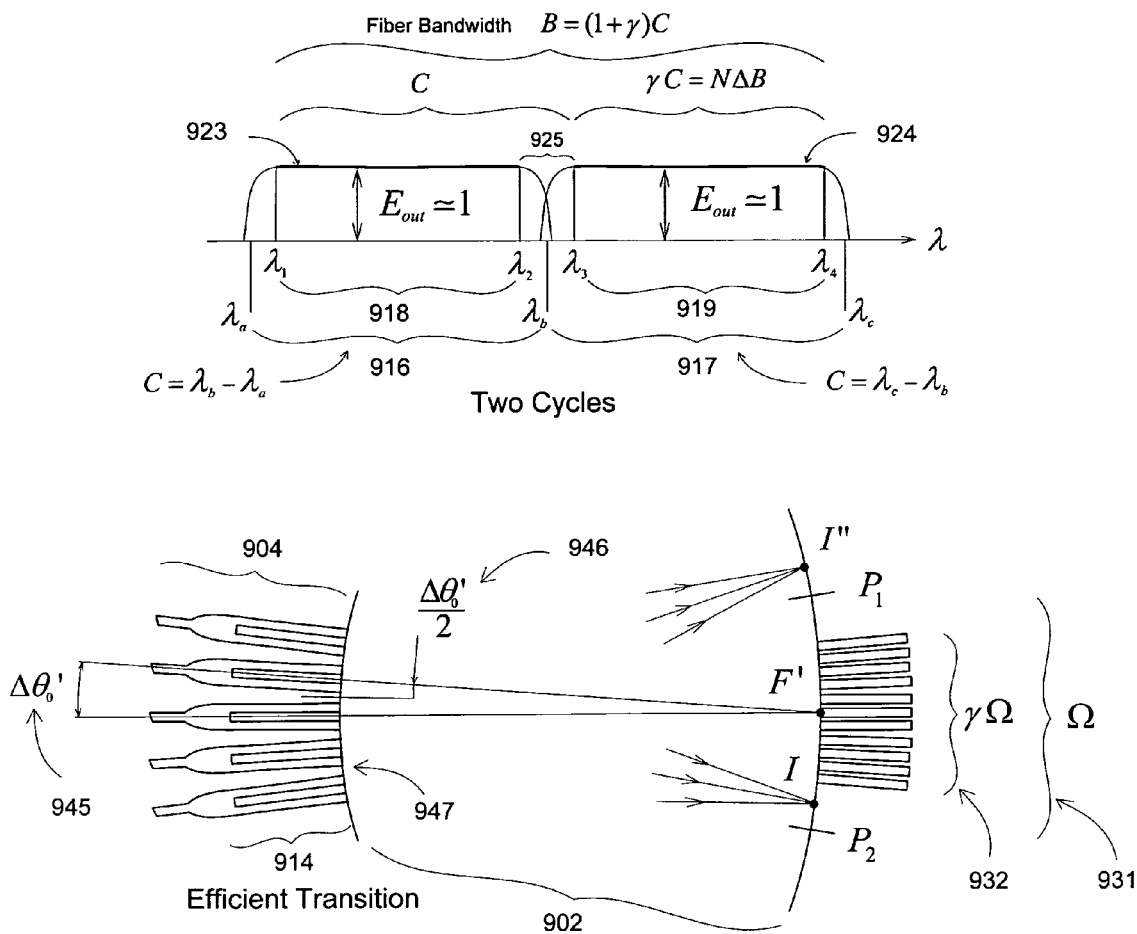
FIG. 9 shows two consecutive cycles 916 and 917 realized by including in the router transitions 914 characterized by input period $\Delta\theta'_0$ equal to twice the output period.

Consider in FIG. 1 the router response to an input signal of increasing wavelength λ applied to the input waveguide, and consider two consecutive cycles of orders Q and Q−1. For simplicity, ignore the wavelength dependence of the central zone width $P_1P_2$. The first cycle of order Q starts at a particular wavelength $\lambda_a$ for which the image I (of order Q) is produced at the first edge $P_1$ of the central zone $P_1P_2$, and the cycle ends at a wavelength $\lambda_b$ for which the image (of order Q) is located at the other edge $P_2$. At this wavelength, a new cycle (of order Q−1) starts at $P_1$, and it ends again at $P_2$ at an higher wavelength $\lambda_c$. In each cycle, the image intensity varies considerably. Typically, the image has maximum intensity at the focal point F', and it is smaller, by at least a factor of two, at the edges of the central zone $P_1P_2$. This variation is primarily caused by the efficiency variation of the output radial array 104, whose efficiency $E_{out}$, is defined as the fraction of the grating output power that is transferred to the principal image. Typically, for a conventional array, the efficiency $E_{out}$, is close to unity only in the vicinity of the focal point F' and, as a consequence, the output waveguides are only included in the vicinity of the focal point, inside a region that is substantially smaller than the central zone width $P_1P_2$. Outside this region, one can show that the loss is primarily caused by the first harmonic of the end discontinuity of the output radial array. Here this unwanted harmonic must be substantially reduced, as shown previously in U.S. Pat. No. 6,873,766 B2, by including in the output radial array special transitions 914 as shown in FIG. 9. By including these transitions, the output period 946 at the end 947 of the array is reduced by a factor of two, as compared to the input period 945. As a consequence, the above second harmonic is eliminated at the junction discontinuity 947. These transitions 914 are characterized by nearly unity matching efficiency (923 and 924), over more than 80% of each cycle (916 and 917) as illustrated in FIG. 9.

The bottom part of FIG. 9 shows the output radial array 904 of the grating, the output coupler 902 and an array of output waveguides located inside the central zone $P_1P_2$ of the grating. As pointed out earlier, the output efficiency of the grating is close to unity inside an interval 932 which is smaller (by a factor γ, as indicated in FIG. 9) than the width Ω of the central zone interval 931. The output waveguides are placed inside this interval 932, and the value of γ is maximized as follows.

In FIG. 9, each element of the radial array 904 includes a transition 914 consisting of two identical waveguides. As a consequence, at the array junction 947 with the coupler 902, the end period 946 is smaller by a factor two than the period 945 at the input of the transition. This eliminates the second harmonic of the junction discontinuity 947 of the radial array and, as a consequence, one can show that transitions 914 are typically characterized by γ>0.8. That is, nearly unity matching efficiency is realized over more than 80% of the central zone 931. On the other hand, without transitions 914, one can show that typically γ<0.5.

The top part of FIG. 9 shows the output efficiency variation in two consecutive cycles of the principal image I. As discussed earlier, the first cycle 916 starts at $\lambda_a$ and it ends at $\lambda_b$, which is the beginning of the next cycle 917. As shown in FIG. 9, the width C of each cycle is given by $$C = \lambda_b - \lambda_a = \lambda_c - \lambda_b$$

Also shown in FIG. 9 is the output efficiency $E_{out}$, produced by transition 914. In each cycle, the efficiency variation is simply a replica of the corresponding variation in the central zone. Therefore, since the efficiency $E_{out}$, is nearly unity in the interval 932, the same result is obtained in the corresponding intervals 923 and 924. The router is therefore characterized by two transmission bands 923 and 924 characterized by nearly unity efficiency $E_{out}$, and each transmission band has width (918 and 919):

$$\lambda_2 - \lambda_1 = \lambda_4 - \lambda_3 = \gamma C \tag{11}$$

Note the two bands 923 and 924 are displaced from each other by the cycle width C, and therefore $$\lambda_3 - \lambda_1 = C$$

Moreover, as stated earlier, the two transmission bands are separated by an interval 925 of lower efficiency. In order to maximize the spectral efficiency E of the router, the fiber bandwidth B must coincide with the above three intervals, so that $$\lambda_4 - \lambda_1 = B \tag{12}$$

Moreover, one must choose $$\gamma C = N\Delta B,$$

so that the output waveguides fully cover (see bottom part of FIG. 9) the central zone interval 932 of maximum efficiency. Under the above conditions one obtains $\lambda_4 - \lambda_1 = C + \gamma C$, and from all the above relations one obtains $$E = \frac{(\lambda_2 - \lambda_1) + (\lambda_4 - \lambda_3)}{\lambda_4 - \lambda_1} = \frac{2\gamma}{1+\gamma} \tag{13}$$

where the numerator is determined by the two transmission bands (11) and, the denominator, by the fiber bandwidth (12). According to the above expression, the spectral efficiency E is determined in a simple way by the parameter γ, and it is important in FIG. 8 to maximize E by maximizing γ. By using a conventional design without transitions 914, one can show that typically γ<0.5, and the efficiency E is then less than 67%. By instead using transitions 914, the efficiency E becomes greater than 89% for γ>0.8. As shown next, the resulting increase in channel spacing is needed in FIG. 8 in order for the access router to be suitable for use outdoors.

An important parameter in FIG. 8 is the 1-dB passband width W of each router. A large W is advantageous because it allows the access router to be used outdoors, without temperature control, and also because the transmitters are then simplified, since a large W reduces the tolerances on the laser wavelengths. The value of W is determined by the channel spacing ΔB, and it varies depending on the router design. For a Gaussian design, W is approximately equal to ΔB/4, but this value can be doubled by modifying the design (so as to produce a maximally flat response as shown in U.S. Pat. No. 5,412,744, issued on May 21, 1995) with a loss penalty of about 2.5 dB. In the former case one obtains for γ=0.8 and B=360 nm $$W \simeq \frac{40}{N} \text{ nm.}$$

From this expression for N=16 one obtains W≈2.5 nm, large enough to allow the router to be used without temperature control. In fact, W≈2.5 nm is almost twice the wavelength variation caused, over the temperature range from −40° C. to +75° C., by the router temperature sensitivity of 0.012 nm/° C. On the other hand, in order to obtain the same result for N=32, a maximally flat response is required, with a loss penalty of 2.5 dB. Note the above large widths W are only obtained in FIG. 8 by using the transitions 914 of FIG. 9.

Notice in FIG. 8 a 2N×1 router is required in the central office, in order to separate and combine the upstream and downstream signals, and only one router cycle is used in this case. The router in the access node of FIG. 8 is thin and long, and about 15 devices can fit on a 6 inches wafer. The other router (in the central office) is larger, and therefore the number of devices is about 10. The loss in either case is about 3 dB for a Gaussian design, as pointed out earlier.

What is claimed is:

1. A planar router, comprising:
an input coupler;
an output coupler; and
a grating having a plurality of waveguides forming arms of the grating, wherein:
successive arms of the grating have a path length difference ΔL which has a substantially constant value from each arm to a corresponding next arm;
the grating includes an input array of radial waveguides, a first curved array of waveguides, a central array of essentially straight waveguides, a second curved array of waveguides, and an output array of radial waveguides;
each waveguide of the first curved array is characterized by a curvature radius R that varies as a function of an angle of rotation θ of the waveguide and variation of R is minimized by choosing parameters of the first curved array so that a derivative of said variation of R is essentially zero for a particular principal angle of rotation θ=θ$_0$ inside an aperture of the first curved array, so that a radius of a principal waveguide corresponding to said principal angle of rotation θ$_0$ is a smallest curvature radius in said first curved array;
each waveguide of the second curved array is characterized by a curvature radius R' that varies as a function of an angle of rotation θ' of the waveguide and variation of R' is minimized by choosing parameters of the second curved array so that a derivative of said variation of R' is essentially zero for a particular principal angle of rotation θ'=θ'$_0$ inside an aperture of the second curved array, so that a radius of a principal waveguide corresponding to said principal angle of rotation θ'$_0$ is a smallest curvature radius in said second curved array;
the first and second curved arrays have opposite curvatures and said principal angles of rotations θ$_0$ and θ'$_0$ are chosen so as to produce nonzero diffraction orders.

2. The planar router as recited in claim 1 wherein:
the waveguides of the central array have substantially constant waveguide spacing.

3. The planar router as recited in claim 1 wherein:
said smallest curvature radii of the first and second principal waveguides are substantially smaller than radii produced at edges of an aperture of the grating;
said principal angles of rotations θ$_0$ and θ'$_0$ of the first and second principal waveguides, respectively, satisfy a condition θ$_0$≧θ'$_0$; and
a path length difference ΔL is greater than a value of an expression:

$$\tan(\theta_0/2) \cdot (s_{max}+s_{min}) - \tan(\theta'_0/2) \cdot 2s_{max}$$

and ΔL is smaller than the value of:

$$\tan(\theta_0/2) \cdot 2s_{max} - \tan(\theta'_0/2) \cdot (s_{max}+s_{min})$$

where $s_{max}$ and $s_{min}$ are respectively largest and smallest waveguide separation in a central grating region that includes the first and second curved arrays and the central array.

4. The planar router as recited in claim 1, further comprising:
only one input waveguide and wherein an angular period of the input array of radial waveguides is greater than an angular period of the output array of radial waveguides.

5. The planar router as recited in claim 1 wherein:
the output array of radial waveguides has, at a junction with the output coupler, an angular period substantially equal to one half an angular period at a junction with the second curved array.

6. The planar router as recited in claim 5, further comprising:
one input waveguide and N output waveguides whose locations on an output circle of the router are chosen so that:
two consecutive cycles of the router provide between said input waveguide and said output waveguides substantially maximum transmission in two separate wavelength intervals $\lambda_1 < \lambda < \lambda_2$ and $\lambda_3 < \lambda < \lambda_4$ respectively produced by the two cycles; and
a spectral efficiency $$\frac{(\lambda_2-\lambda_1)(\lambda_4-\lambda_3)}{(\lambda_4-\lambda_1)}$$

is greater than 0.7.
wherein $\lambda_1$, $\lambda_2$, $\lambda_3$, $\lambda_4$ denote wavelengths that define boundaries of said wavelength intervals, and
wherein the router is coupled to a plurality of fibers.

7. The planar router as recited in claim 6 wherein the router is used in a local access node to provide, in each of the fibers coupled to the router, efficient transmission of downstream and upstream signals in two separate wavelength intervals $\lambda_1 < \lambda < \lambda_2$ and $\lambda_3 < \lambda < \lambda_4$ respectively produced by the two consecutive cycles of the router.

8. An optical arrangement, comprising:
a first router as recited in claim 5;
a second router having one input waveguide and N output waveguides whose locations on an output circle of the second router are chosen so that two consecutive cycles of the second router provide between said input waveguide and said output waveguides substantially maximum transmission in two separate wavelength intervals $\lambda_1 < \lambda < \lambda_2$ and $\lambda_3 < \lambda < \lambda_4$ respectively produced by the two cycles and a spectral efficiency $$\frac{(\lambda_2 - \lambda_1)(\lambda_4 - \lambda_3)}{(\lambda_4 - \lambda_1)}$$

is greater than 0.7, and a fiber is coupled between the first and second routers, wherein:

$\lambda_1, \lambda_2, \lambda_3, \lambda_4$ denote wavelengths that define boundaries of said wavelength intervals;

the first router includes 2N input ports and one output port; and 2N wavelength channels are transmitted in one cycle of the first router.

9. The planar router as recited in claim 1 wherein each of the arms of the grating includes sections having different effective refractive indexes.

10. An apparatus, comprising:

input coupler means for receiving an input signal;

grating means for propagating components of the received input signal in respective ones of a plurality of arms, the grating means including an input array of radial waveguides, a first curved array of waveguides, a central array of essentially straight waveguides, a second curved array of waveguides, and an output array of radial waveguides; and output coupler means for combining the components that have propagated in the arms into an output signal, wherein the first and second curved arrays have opposite curvatures, wherein each waveguide of the first curved array is characterized by a curvature radius R that varies as a function of an angle of rotation $\theta$ the waveguide and variation of R is minimized by choosing parameters of the first curved array so that a derivative of said variation of R is essentially zero for a particular principal angle of rotation $\theta = \theta_0$ inside an aperture of the first curved array, so that a radius of a principal waveguide corresponding to said principal angle of rotation $\theta_0$
is a smallest curvature radius in said first curved array, and wherein each waveguide of the second curved array is characterized by a curvature radius R' that varies as a function of an angle of rotation $\theta'$ of the waveguide and variation of R' is minimized by choosing parameters of the second curved array so that a derivative of said variation of R' is essentially zero for a particular principal angle of rotation $\theta' = \theta'_0$ inside an aperture of the second curved array, so that a radius of a principal waveguide corresponding to said principal angle of rotation $\theta'_0$ is a smallest curvature radius in said second curved array.

11. The apparatus of claim 10 wherein said principal angles of rotations $\theta_0$ and $\theta'_0$ are chosen so as to produce nonzero diffraction orders.

12. The apparatus of claim 10 wherein each of the arms of the grating means includes sections having different effective refractive indexes.

13. The apparatus of claim 10 wherein successive arms of the grating means have a path length difference $\Delta L$ which has a substantially constant value from each arm to a corresponding next arm.

14. The apparatus of claim 10 wherein the waveguides of the central array have substantially constant waveguide spacing.

15. The apparatus of claim 10 wherein the radial waveguides in the input and output arrays have constant radial separation between waveguides.

16. The apparatus of claim 10 wherein said smallest curvature radii of the first and second principal waveguides are substantially smaller than radii produced at edges of an aperture of the grating.

17. The apparatus of claim 10 wherein the apparatus comprises a router.

18. The apparatus of claim 10 wherein an angular period of the input array of radial waveguides is greater than an angular period of the output array of radial waveguides.

19. The apparatus of claim 10 wherein the output array of radial waveguides has, at a junction with the output coupler means, an angular period substantially equal to one half an angular period at a junction with the second curved array.

20. A method, comprising:

receiving an input optical signal at an input coupler;

propagating components of the received input signal in respective ones of a plurality of arms of a grating, the grating including an input array of radial waveguides, a first curved array of waveguides, a central array of essentially straight waveguides, a second curved array of waveguides, and an output array of radial waveguides, wherein the first and second curved arrays have opposite curvatures, wherein each waveguide of the first curved array is characterized by a curvature radius R that varies as a function of an angle of rotation $\theta$ of the waveguide and variation of R is minimized by choosing parameters of the first curved array so that a derivative of said variation of R is essentially zero for a particular principal angle of rotation $\theta' = \theta'_0$ inside an aperture of the first curved array, so that a radius of a principal wave guide corresponding to said principal angle of rotation $\theta'_0$ is a smallest curvature radius in said first curved array, and wherein each waveguide of the second curved array is characterized by a curvature radius R' that varies as a function of an angle of rotation $\theta'$ of the waveguide and variation of R' is minimized by choosing parameters of the second curved array so that a derivative of said variation of R' is essentially zero for a particular principal angle of rotation $\theta' = \theta'_0$ inside an aperture of the second curved array, so that a radius of a principal waveguide corresponding to said principal angle of rotation $\theta'_0$ is a smallest curvature radius in said second curved array; and combining the components that have propagated in the arms into an output signal at an output coupler.

21. The method of claim 20, further comprising arranging said principal angles of rotations $\theta_0$ and $\theta'_0$ so as to produce nonzero diffraction orders.

22. The method of claim 20, further comprising providing each of the arms of the grating with sections having different effective refractive indexes.

23. The method of claim 20, further comprising providing successive arms of the grating with a path length difference $\Delta L$ which has a substantially constant value from each arm to a corresponding next arm.

24. The method of claim 20, further comprising providing the waveguides of the central array with substantially constant waveguide spacing.

25. The method of claim 20, further comprising providing the radial waveguides in the input and output arrays with constant radial separation between waveguides.

26. The method of claim 20 wherein said smallest curvature radii of the first and second principal waveguides are substantially smaller than radii produced at edges of an aperture of the grating.

27. The method of claim 20 wherein an angular period of the input array of radial waveguides is greater than an angular period of the output array of radial waveguides.

28. The method of claim 20 wherein the output array of radial waveguides has, at a junction with the output coupler, an angular period substantially equal to one half an angular period at a junction with the second curved array.

* * * * *

UNITED STATES PATENT AND TRADEMARK OFFICE
CERTIFICATE OF CORRECTION

PATENT NO. : 7,702,200 B2
APPLICATION NO. : 12/151469
DATED : April 20, 2010
INVENTOR(S) : Corrado Pietro Dragone It is certified that error appears in the above-identified patent and that said Letters Patent is hereby corrected as shown below:

Column 15

Line 38, "of an angle of rotation θ the waveguide" should read --of an angle of rotation θ of the waveguide--

Column 16

Line 41, "radius of a principal wave guide corresponding" should read --radius of a principal waveguide corresponding--

Signed and Sealed this

Twenty-eighth Day of September, 2010

David J. Kappos
*Director of the United States Patent and Trademark Office*